(12) United States Patent
Barron

(10) Patent No.: US 7,244,123 B1
(45) Date of Patent: Jul. 17, 2007

(54) TRAINING TANK FOR PERSONNEL ENTRY, EXIT AND RESCUE

(75) Inventor: John Barron, San Dimas, CA (US)

(73) Assignee: Matrix Service, Inc., Tulsa, OK (US)

( * ) Notice: Subject to any disclaimer, the term of this patent is extended or adjusted under 35 U.S.C. 154(b) by 264 days.

(21) Appl. No.: 10/871,309

(22) Filed: Jun. 18, 2004

(51) Int. Cl.
*G09B 9/00* (2006.01)

(52) U.S. Cl. .................. 434/226; 434/365; 434/366; 280/837; 220/562

(58) Field of Classification Search .............. 434/226, 434/29, 72, 373, 390, 365, 219; 182/141, 182/127, 48; 435/365, 219, 226, 29, 401; 280/830, 837, 838, 839; 105/358–362; 296/24.1; 472/136; 114/314; 405/129.55, 8; 220/562, 220/564
See application file for complete search history.

(56) References Cited

U.S. PATENT DOCUMENTS

| | | | | |
|---|---|---|---|---|
| 3,489,320 A * | 1/1970 | MacKinnon | ................ | 222/156 |
| 3,500,648 A * | 3/1970 | Daniell | ................ | 405/192 |
| 3,675,607 A * | 7/1972 | Dorschel | ................ | 114/314 |
| 4,346,905 A | 8/1982 | Smetanick | ................ | 280/5 |
| 4,662,287 A | 5/1987 | Connell | ................ | 109/1 |
| 5,071,166 A | 12/1991 | Marino | ................ | 280/830 |
| 5,752,835 A * | 5/1998 | Whitmer, Sr. | ................ | 434/226 |
| 6,062,342 A | 5/2000 | Dobson | ................ | 182/230 |
| 6,152,492 A | 11/2000 | Markham et al. | ................ | 280/837 |
| 6,375,222 B1 | 4/2002 | Wade | ................ | 280/837 |
| 6,557,896 B1 | 5/2003 | Stobart | ................ | 280/838 |
| 6,564,961 B1 | 5/2003 | Klein | ................ | 220/563 |
| 6,799,975 B1 * | 10/2004 | Dunn | ................ | 434/365 |
| 7,008,230 B2 * | 3/2006 | Hoglund | ................ | 434/236 |

OTHER PUBLICATIONS

The Modern Group (Assignee of US Patent 6152492) Online Catalog—specifies dimensions of Liquid Storage Tank Trailer (US Patent 6152492) http://www.modernusa.com/Dragon/Catalog/SmoothV-BottomFrac.html.*

* cited by examiner

*Primary Examiner*—Peter M. Cuomo
*Assistant Examiner*—Colleen M Quinn
(74) *Attorney, Agent, or Firm*—Head, Johnson & Kachigian

(57) ABSTRACT

A self-contained training device for simulated personnel entry, exit and rescue in confined space scenarios. The device features an enclosed tank mounted on a truck trailer. The tank has at least one top portal and at least one side portal for entry and exit. An enclosed pipe is situated within the tank and has separate points of entry and exit. The top of the tank features a walkway and handrail.

12 Claims, 7 Drawing Sheets

TRAINING TANK FOR PERSONNEL ENTRY, EXIT AND RESCUE

BACKGROUND OF THE INVENTION

1. Field of the Invention

The present invention is directed to a self-contained, mobile, confined or enclosed space training device to train for personnel entry, exit and rescue procedures. In particular, the present invention relates to a self-contained vehicle mounted device for training personnel who work with, in, and around confined or enclosed space work areas.

2. Prior Art

Certain work places are defined by the U.S. Department of Labor Occupational Safety and Health Administration ("OSHA") as "confined spaces" because their configurations hinder the activities of personnel who must enter, work in, and exit them. For instance, the U.S. Department of Labor has set forth the following:

> . . . employees who work in process vessels generally must squeeze in and out through narrow openings and perform their tasks while cramped or contorted. OSHA uses the term "confined space" to describe such spaces. In addition, there are many instances where employees who work in confined spaces face increased risk of exposure to serious hazards. In some cases, confinement itself poses entrapment hazards. In other cases, confined space work keeps employees closer to hazards, such as asphyxiating atmospheres or the moving parts of machinery. OSHA uses the term "permit-required confined space" (permit space) to describe those spaces that both meet the definition of "confined space" and pose health or safety hazards. The following questions link to resources that provide safety and health information relevant to confined spaces in the workplace. (www.osha.gov/SLTC/confinedspaces)

There are various hazards that may be encountered when entering, exiting and working in confined space work places.

Confined spaces are categorized as those with open tops having a depth that will restrict natural movement of air, and enclosed spaces with very limited openings for entry. Those with limited access pose additional problems. Even when the containers or tanks are opened, gases which are heavier than air, such as carbon dioxide or propane, may lie in a tank for hours or days after the containers have been opened.

Entry into confined or enclosed spaces by personnel may be done for various reasons. These include inspection, repair, maintenance such as cleaning or painting, and similar operations. Additionally, unauthorized entry may be involved where various workers and trades are involved.

Finally, emergency rescue may be a reason for entry by personnel into confined or enclosed spaces.

Because of these conditions, the U.S. Department of Labor and other jurisdictions require that any employee required or permitted to enter a permit-required confined space must have successfully completed, as a minimum, certain training. A permit verifies completion of surveillance, testing, space ventilation and entry procedures. For example, 29 CFR Part No. 1910.146 Appendix C provides:

> Entry Procedures. The following procedure shall be observed under any of the following conditions: 1.) Testing demonstrates the existence of dangerous or deficient conditions and additional ventilation cannot reduce concentrations to safe levels; 2.) The atmosphere tests as safe but unsafe conditions can reasonably be expected to develop; 3.) It is not feasible to provide for ready exit from spaces equipped with automatic fire suppression systems and it is not practical or safe to deactivate such systems; 4.) An emergency exists and it is not feasible to wait for pre-entry procedures to take effect.
>
> All personnel must be trained. A self contained breathing apparatus shall be worn by any person entering the space. At least one worker shall stand by the outside of the space ready to give assistance in case of emergency. The standby worker shall have a self contained breathing apparatus available for immediate use. There shall be at least one additional worker within sight or call of the standby worker. Continuous powered communications shall be maintained between the worker within the confined space and standby personnel.
>
> If at any time there is any questionable action or non-movement by the worker inside, a verbal check will be made. If there is no response, the worker will be moved immediately. Exception: If the worker is disabled due to falling or impact, he/she shall not be removed from the confined space unless there is immediate danger to his/her life. Local fire department rescue personnel shall be notified immediately. The standby worker may only enter the confined space in case of an emergency (wearing the self contained breathing apparatus) and only after being relieved by another worker. Safety belt or harness with attached lifeline shall be used by all workers entering the space with the free end of the line secured outside the entry opening. The standby worker shall attempt to remove a disabled worker via his lifeline before entering the space.
>
> When practical, these spaces shall be entered through side openings—those within 3½ feet (1.07 m) of the bottom. When entry must be through a top opening, the safety belt shall be of the harness type that suspends a person upright and a hoisting device or similar apparatus shall be available for lifting workers out of the space.
>
> In any situation where their use may endanger the worker, use of a hoisting device or safety belt and attached lifeline may be discontinued.

Entry and exit with hoisting harnesses and breathing equipment requires considerable personnel training.

In addition, 29 CFR Part No. 1910.146(k)(2)(iv) requires personnel to practice making confined space rescues at least once every twelve (12) months.

Where valves, motors and other mechanical devices operate in conjunction with confined space tanks or containers, prescribed lock-out, tag out procedures must be employed. For example, where a motor and valve are involved, the power switch or switches must be turned off at a power panel. Thereafter, a tag is affixed to a lock in order to inform and advise others that a permit, confined space entry is in progress. Additionally, any and all valves will be closed. Each valve will be set to the closed position and a chain and lock secure the valve in that position. A tag will be attached to the valve warning that a confined space entry is in progress.

Of course, it is possible to utilize existing confined space tanks or containers to train personnel in entry, exit and rescue procedures. This will often times require disabling or taking the container tank out of service during these training sessions. Smetanick (U.S. Pat. No. 4,346,905) illustrates an example of a tank trailer to transport fluid products but is otherwise dissimilar.

Accordingly, it would be advantageous to provide a training device for personnel entry, exit and rescue procedures to simulate confined spaces without having to interrupt or interfere with operation of actual tanks or containers.

Additionally, it would be advantageous to provide a training tank device which would provide opportunities for training in multiple procedures and situations that might be encountered in confined space operations.

It would also be advantageous to provide a confined space training device to demonstrate proper entrance, exit and rescue procedures.

It would also be advantageous to provide a self-contained, integrated, mobile confined space training device which could be brought to a work site for periodic training of personnel.

SUMMARY OF THE INVENTION

The present invention provides a self-contained, mobile confined or enclosed space training device for personnel entry, exit and rescue. The device includes an enclosed tank which is mounted on a vehicle, such as a tractor trailer, through use of supports.

The training tank device includes a pair of top entries through a pair of top portals. The top ports or portals may be enclosed by covers.

The space beneath each top portal is opened and a converging wall may be located within the tank beneath one or more of the portals.

An optional walkway surrounds each top portal. A hand rail surrounds the walkway and a ladder may also be provided. A pair of horizontal entries extend radially into the tank from a side.

The device also includes a pipe which transverses the entire length of the tank with a gate or door closing the entry and exit. The pipe includes a pair of 45° bends.

One or more view port openings may be provided for personnel to view various training operations.

The training tank device also includes a valve or valves and electric switch panel to simulate conditions on a tank or container. Personnel may train to become proficient in lock-out, tag-out procedures which are required prior to entry and rescue procedures.

DETAILED DESCRIPTION OF THE PREFERRED EMBODIMENTS

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

Figure 1:
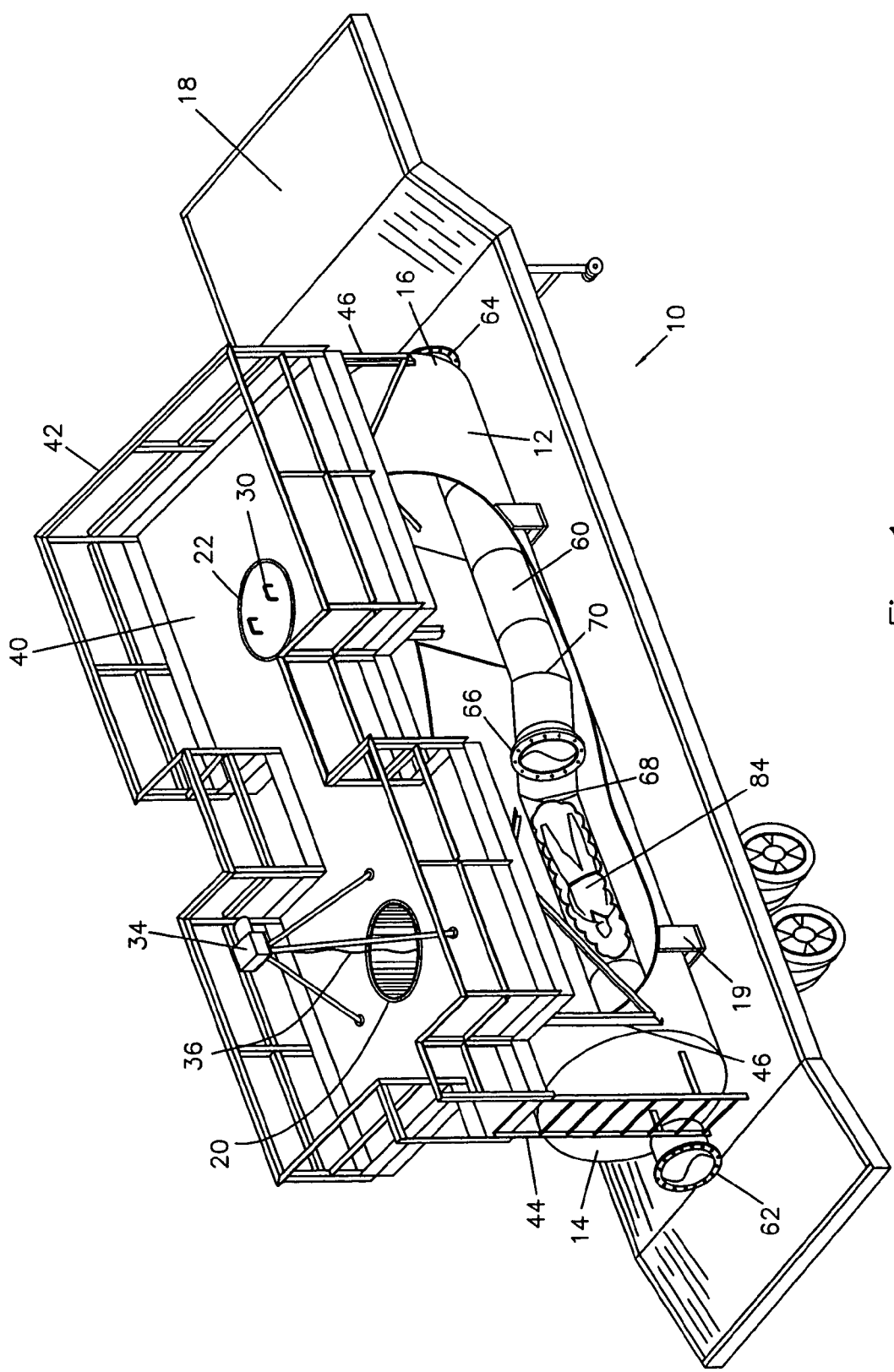
FIG. 1 illustrates a perspective view of a confined or enclosed space training device constructed in accordance with the present invention.

Referring to the drawings in detail, FIG. 1 illustrates a perspective view of a training tank 10 constructed in accordance with the present invention.

The device 10 includes an enclosed tank 12 which has been partially cut-away in FIG. 1 for ease of viewing. The tank 12 may take many configurations but in the present, preferred embodiment, the tank 12 is an elongated cylindrical tank having a pair of opposed ends 14 and 16. A portion of the tank 12 in FIG. 1 has been cut away for ease of comprehension.

As will be described herein, the training device 10 is self-contained and integrated and is also mounted on a vehicle 18 so that it is mobile. The training tank device 10 may be brought to a work site where confined space containers or tanks are located so that personnel may train periodically in entrance, exit and rescue procedures. The vehicle 18 may take many forms including a tractor trailer which may be attached to a truck (not shown) for moving the device 10. The vehicle 18 may be permanently mounted on the vehicle through use of supports 19.

The training tank device 10 includes a pair of top entries through a pair of top portals 20 and 22. In one example, the top entry portals are approximately 24 inches in diameter. The top entry portals 20 and 22 may be between 18 and 30 inches in diameter although other designs are possible within the spirit and scope of the present invention. The top entry portals 20 and 22 may be tangential to the exterior of the tank 12 or, as in the present embodiment, may be spaced from and above the exterior of the tank 12 and joined by tubes 24 and 26, respectively. The top ports 20 and 22 may be closed by removable covers 28 and 30.

As seen in FIG. 1, the cover 28 has been removed and a tripod 34 placed over the portal 20 with a line 36 to raise or lower personnel into and out of the confined space.

Figure 2:
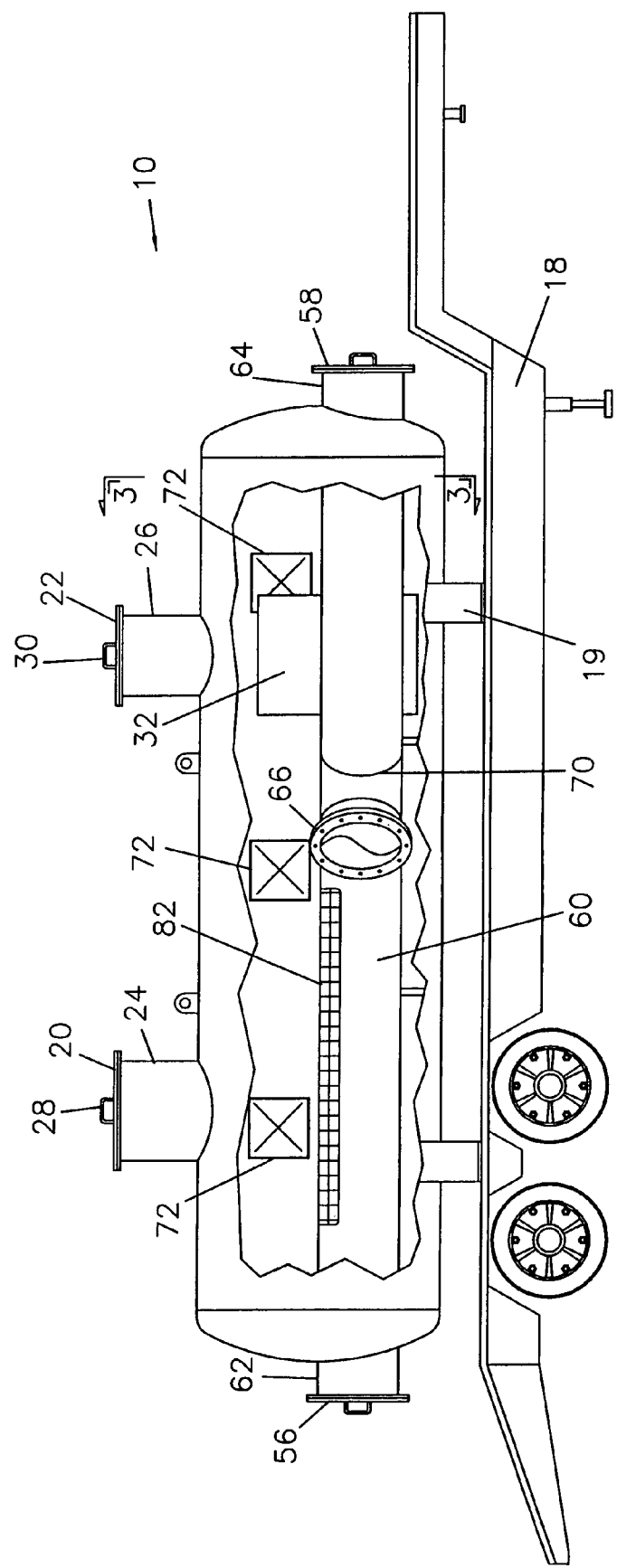
FIG. 2 illustrates a side view of the device illustrated in FIG. 1 with a portion cut away for ease of viewing.

As seen in the side view in FIG. 2, where a portion of the side of the tank 12 has been cut away for ease of viewing, the spaces beneath top portal 20 and beneath top portal 22 are open so that personnel entering through either of the portals will encounter a drop into the tank 12. As best seen in FIG. 2, an additional converging wall 32 in the form of a flat metal plate is provided within the tank so that a converging wall is encountered upon entry through portal 22. In particular, the converging wall 32 is not perpendicular to the portal of the tank, but is in angular relation thereto. Accordingly, personnel must be able to work with and around the converging wall 32 when entering and exiting the tank 12. The converging wall 32 will, thus, simulate conditions that may be encountered. In the present case, the drop from the tank until encountering the converging wall is at least 8 feet (8').

Returning to a consideration of FIG. 1, an optional walkway 40 surrounds each top portal 20 and 22 and at the same elevation, to simulate actual tanks or containers and to enhance training and educational opportunities for personnel. A hand rail 42 surrounding the walkway and a ladder 44 may also be provided. Bracing 46 supports the walkway to the tank 12. The walkway, hand rail, ladder and bracing has been removed from FIG. 2.

Figure 3:
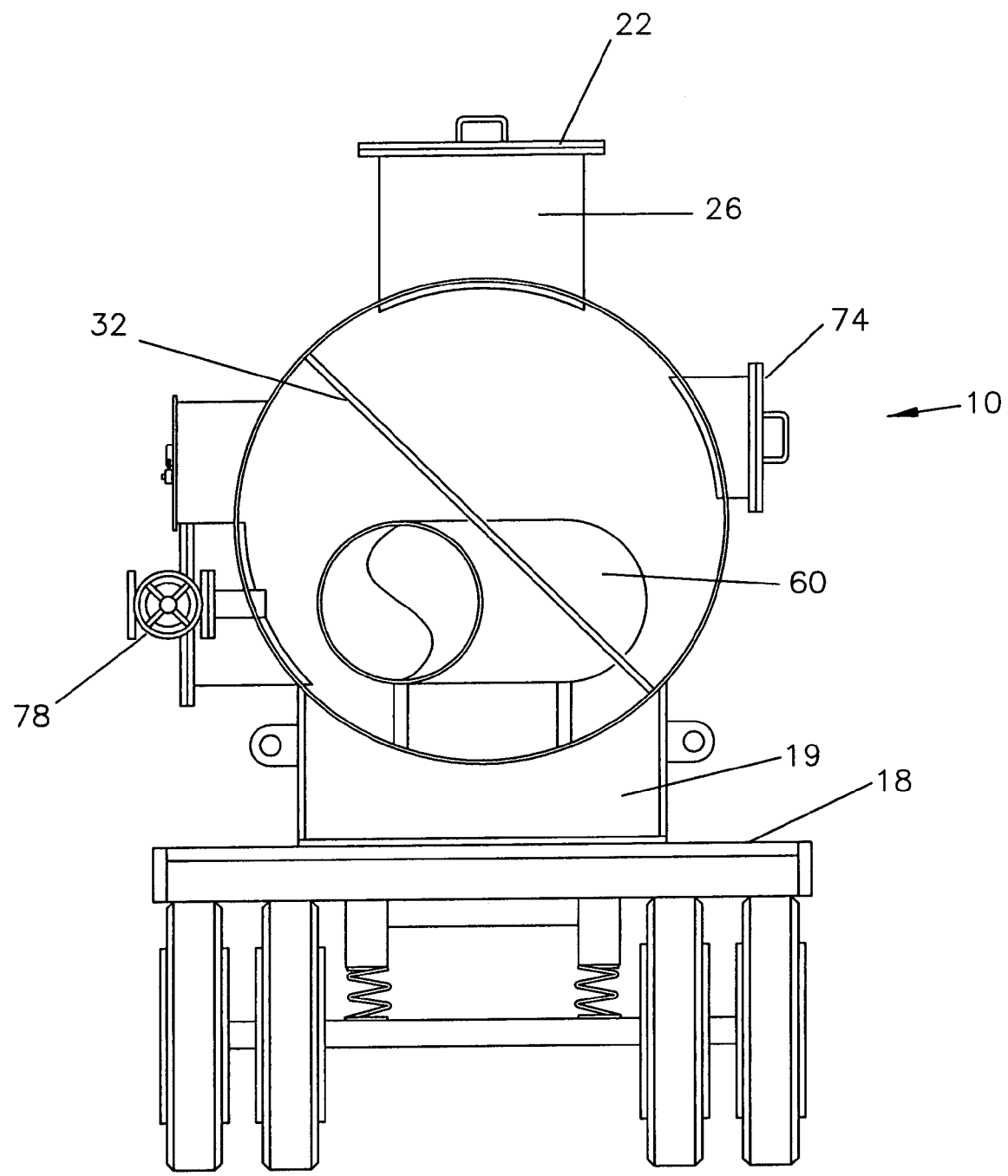
FIG. 3 illustrates a sectional view taken along section line 3-3 of FIG. 2.

FIG. 3 is a sectional view taken along section line 3-3 of FIG. 2. As seen in FIG. 3 and also seen in the top view in FIG. 4, the device 10 includes at least one and, in the present embodiment, two side or horizontal entries 48 and 50. The side or horizontal entries 48 and 50 extend radially into the tank 12 from the side. Horizontal entry 48 includes an 18 inch hinged door 52 while entry 50 includes a 24 inch manway 54 for exit, entry and rescue. Various other arrangements are possible within the spirit and scope of the present invention.

Accordingly, personnel may perform and train for both vertical and horizontal entries, exits and rescues.

The device 10 also includes a pipe 60 which traverses the entire length of the tank 12 and terminates on each end in entry 62 and exit 64. A gate or door, 56 and 58, closes the entry 62 and exit 64, respectively.

The diameter of the pipe 60 may vary but is generally between 18 and 30 inches (18" to 30") in diameter. The pipe 60 may also include an optional internal entry 66. The pipe 60 includes at least one bend in the length of the pipe, and in a preferred embodiment illustrated, a pair of 45° bends 68 and 70.

The pipe 60 may also include an optional mesh portion 82 so that trainees can readily observe operations within the pipe.

Figure 4:
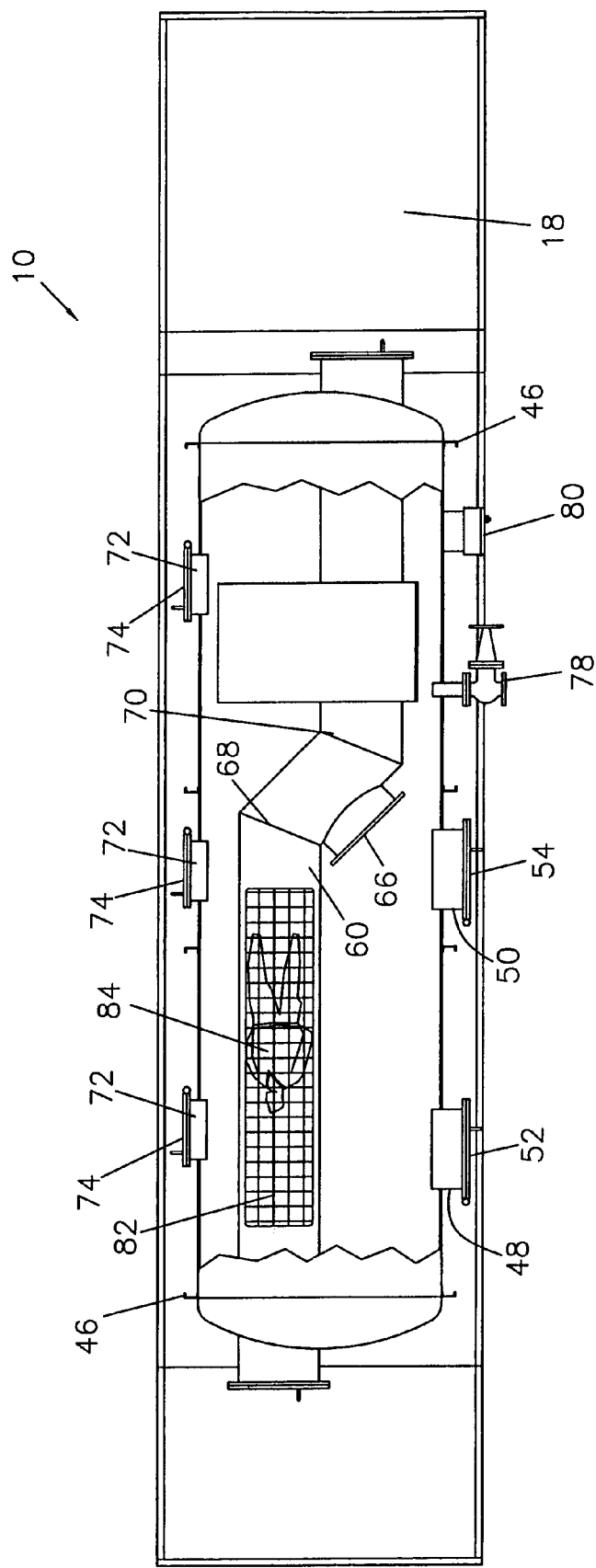
FIG. 4 illustrates a top view of a confined or enclosed space training device shown in FIG. 1 with a portion cut away for ease of viewing.
Figure 5:
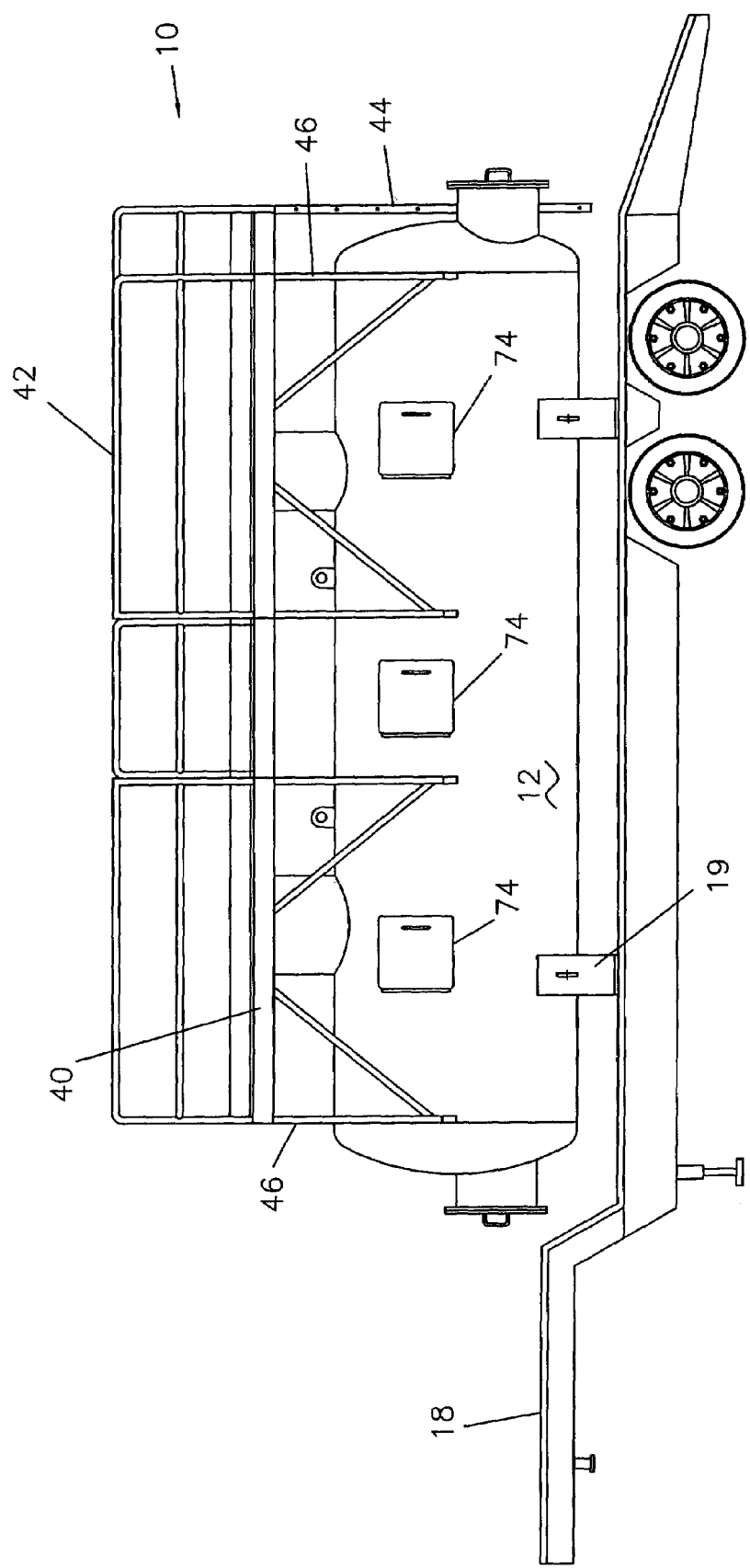
FIG. 5 illustrates a side view of the confined space training device shown in FIG. 1.
Figure 6:
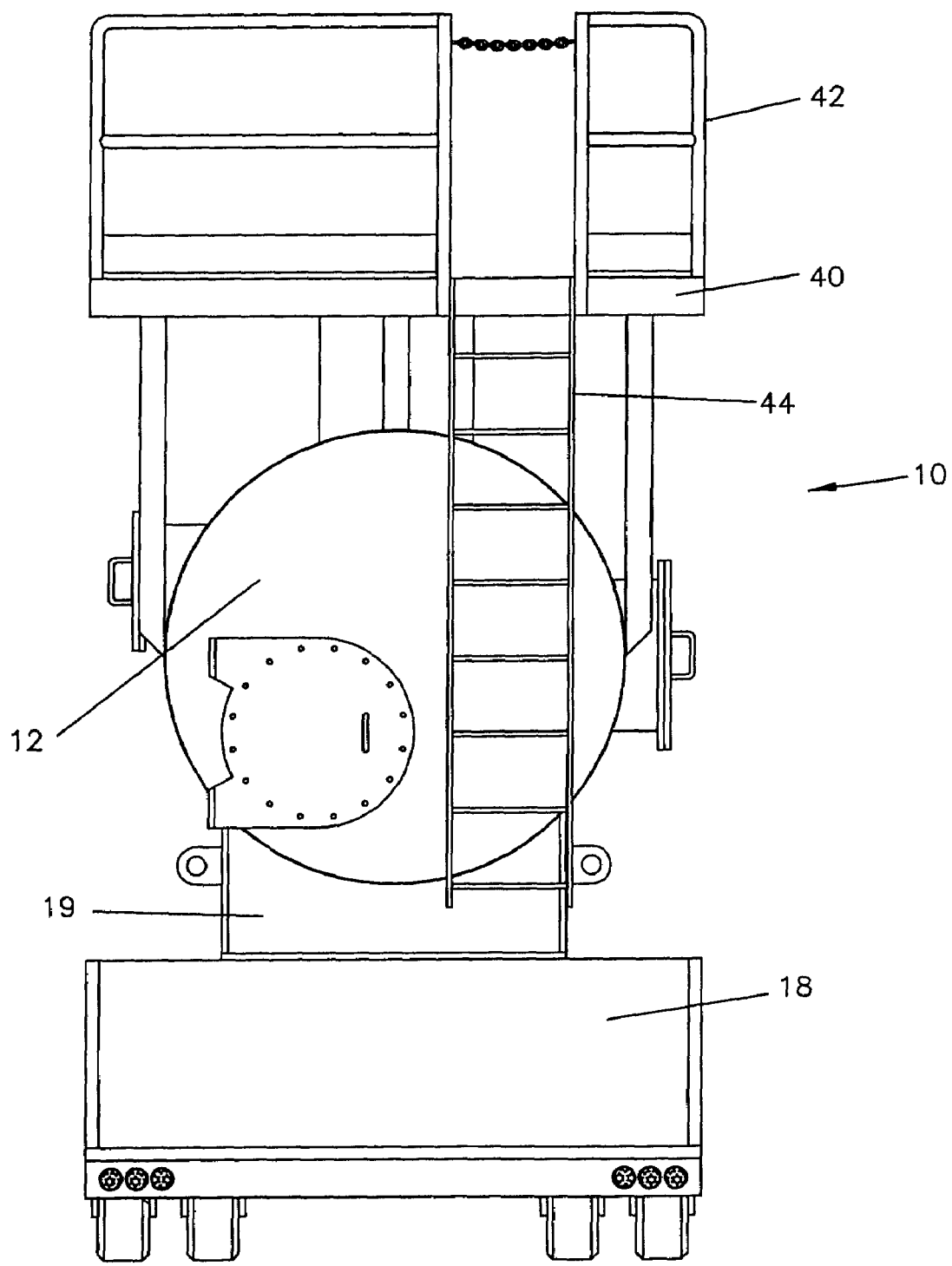
FIG. 6 illustrates an end view of the confined space training device shown in FIG. 1.
Figure 7:
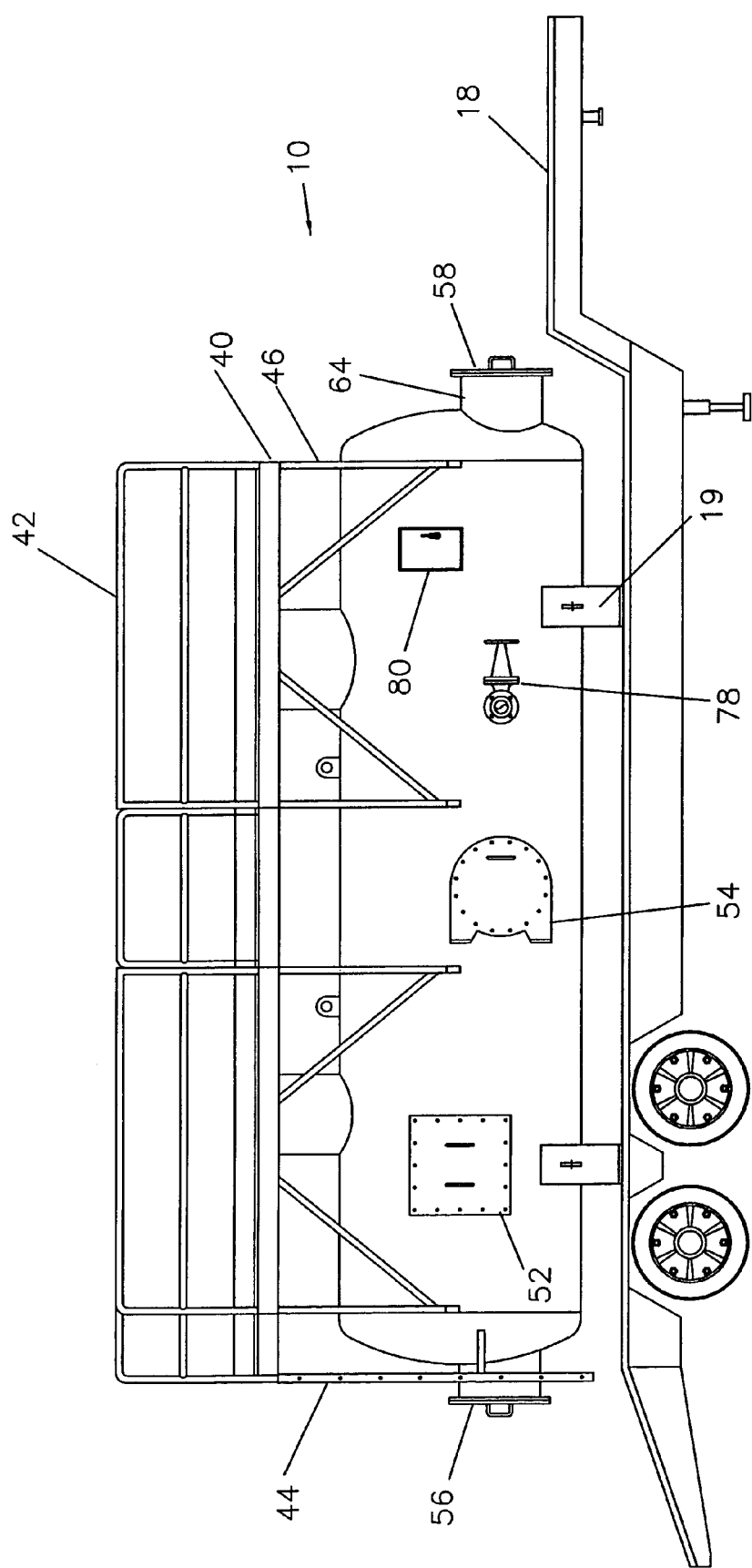
FIG. 7 illustrates a side view of the confined space training device shown in FIG. 1.

As seen in FIGS. 1 and 4, one training procedure may be to rescue a mannequin 84 from within the pipe 60.

The sidewall of the tank 12 may include one or more view port openings covered by transparent windows 72 for personnel to view training operations. The transparent windows 72 may be covered by hinged doors 74 that may be closed when it is desired to keep the inside of the tank dark.

With reference to FIGS. 3 and 4, the training tank device 10 may include a valve or valves 78 and an electrical switch panel 80 to simulate conditions on a tank or container. Personnel may train to become proficient in lock-out, tag out procedures which are required prior to entry and rescue procedures. For example, a valve or valves 78 will be turned off and then locked and tagged. The electrical switch panel 80 will be operated to turn off all electrical switches and then locked and tagged in the "off" position prior to any entry, rescue or other operations with the tank or container.

Since the device 10 is highly mobile, it may be brought to work areas for personnel training. The present invention provides a self-contained and fully integrated mobile device to train and educate personnel.

Whereas, the present invention has been described in relation to the drawings attached hereto, it should be understood that other and further modifications, apart from those shown or suggested herein, may be made within the spirit and scope of this invention.

What is claimed is:

1. A confined or enclosed space training device for personnel entry, exit and rescue, which device comprises:
    a truck trailer for attachment to a vehicle;
    an enclosed elongated cylindrical tank mounted on said trailer;
    at least one opening in said tank covered by a transparent window for viewing from outside said tank into said tank;
    at least one top entry through a portal in said elongated cylindrical tank;
    at least one pipe extending longitudinally through said elongated cylindrical tank, said pipe having a longitudinal axis, wherein said pipe has at least one bend with respect to said longitudinal axis of said pipe; and
    at least one side entry into said tank from said elongated cylindrical pipe through a portal.

2. A confined or enclosed space training device as set forth in claim 1 wherein said top entry portal is between 18 to 30 inches in diameter.

3. A confined or enclosed space training device as set forth in claim 1 wherein said at least one pipe is between 18 to 30 inches in diameter.

4. A continued or enclosed space training device as set forth in claim 1 wherein said at least one bend in said pipe within said elongated cylindrical tank is substantially 45°.

5. A confined or enclosed space training device as set forth in claim 1 wherein said device includes a panel external to said elongated cylindrical tank with a switch or switches to simulate a lock-out, tag out procedure prior to entry.

6. A confined or enclosed space training device as set forth in claim 1 including at least one valve external to said elongated cylindrical tank to simulate a lock-out, tag out procedure prior to entry.

7. A confined or enclosed space training device as set forth in claim 1 including a walkway around said at least top entry portal.

8. A confined or enclosed space training device as set forth in claim 7 including a handrail around said walkway.

9. A confined or enclosed space training device as set forth in claim 1 including a converging wall within said tank aligned below said at least one top entry.

10. A confined or enclosed space training device as set forth in claim 9 wherein said converging wall is at least eight feet below the at least one top entry below which the converging wall is aligned.

11. A confined or enclosed space training device as set forth in claim 1 wherein said at least one pipe has two bends of substantially 45° each therein.

12. A confined or enclosed space training device for personnel entry, exit and rescue, which device comprises:
    a truck trailer for attachment to a vehicle;
    an enclosed elongated cylindrical tank mounted on said vehicle;
    at least one opening in said elongated cylindrical tank covered by a transparent window for viewing from outside said elongated cylindrical tank into said elongated cylindrical tank;
    at least one top entry through a portal in said elongated cylindrical tank with a drop from said top entry;
    a walkway around said top entry;
    a handrail around said walkway;
    at least one pipe extending longitudinally through said elongated cylindrical tank, said pipe having a longitudinal axis wherein said pipe has at least two bends, each of which are substantially 45° with respect to said longitudinal axis of said pipe,
    at least one side entry into said elongated cylindrical tank from said pipe through a portal;
    at least one converging wall aligned below said at least one top entry, wherein said converging wall is at least eight feet below said at least one top entry;
    a panel external to said elongated cylindrical tank with a switch or switches to simulate a lock-out, tag out procedure; and
    at least one valve external to said elongated cylindrical tank said elongated cylindrical tank to simulate a lock-out, tag out procedure.

* * * * *